April 25, 1933.                J. MIHALYI                1,905,485
BASE TYPE RANGE FINDER
Filed Dec. 8, 1931
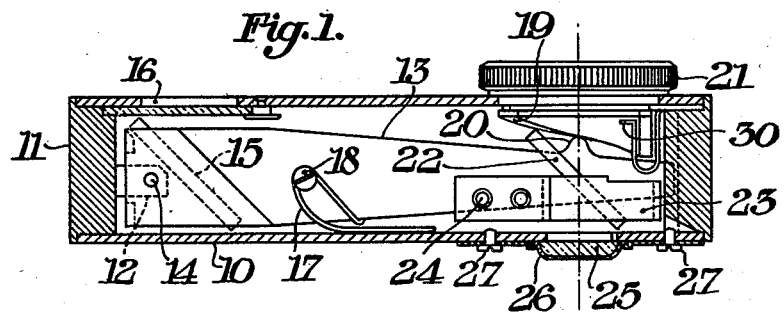
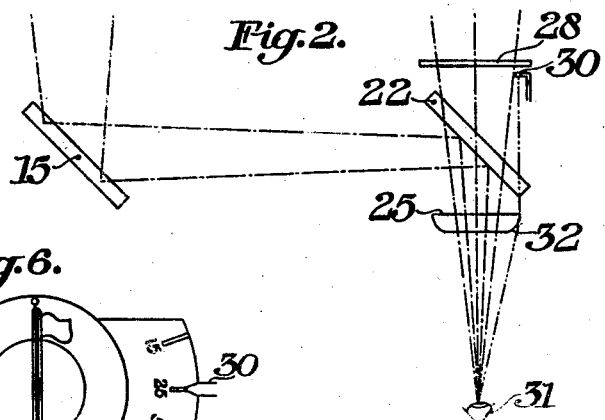
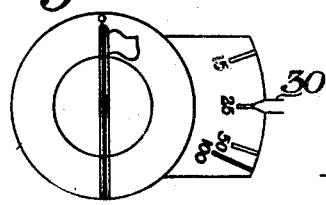
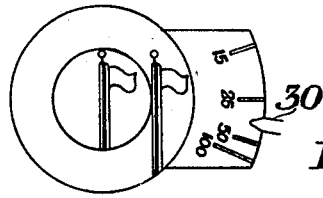
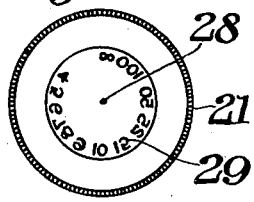
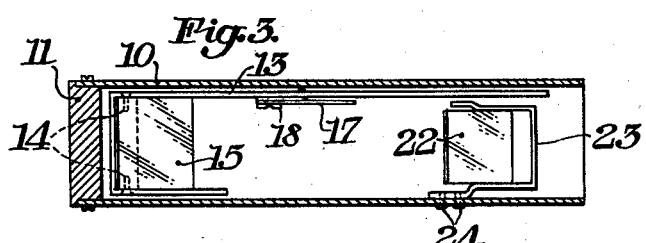
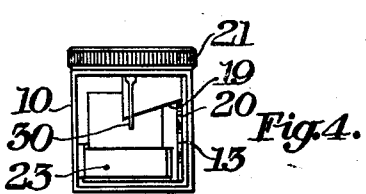
Inventor:
Joseph Mihalyi,
By
Holla H. Carter
Attorneys Patented Apr. 25, 1933

1,905,485

UNITED STATES PATENT OFFICE

JOSEPH MIHALYI, OF ROCHESTER, NEW YORK, ASSIGNOR TO EASTMAN KODAK COMPANY, OF ROCHESTER, NEW YORK, A CORPORATION OF NEW YORK

BASE TYPE RANGE FINDER

Application filed December 8, 1931. Serial No. 579,759.

My invention relates to range finders for determining the distance of an observed object from the point of observation and more particularly to a base type pocket range finder in which an adjustable member is employed to obtain the coincidence or alinement of two normally non-coincident or non-alined images of an observed object, the displacement of the adjustable member necessary to bring the images into coincidence indicating on a scale the range of the object.

It is an object of my invention to provide a device of the kind described that is simple and compact and that indicates directly the range without requiring the user of the device to make any mental calculations.

My invention resides in certain improvements and combinations of parts as will be hereinafter more fully described and the novel features will be pointed out in the appended claims.

In the drawing:

Fig. 1 is a side elevation in section of a range finder constructed in accordance with and illustrating one embodiment of my invention;

Fig. 2 is a diagrammatic view showing the optical system of the device of Fig. 1;

Fig. 3 is a plan view in section and with parts broken away showing the mounting of the reflecting members;

Fig. 4 is an end view of the device of Fig. 1 with the end wall removed;

Fig. 5 is a view showing the images of an object field out of alinement as they appear to the observer before adjustment of the device;

Fig. 6 is a similar view with the images coincident after adjustment; and,

Fig. 7 is a plan view of the adjusting element showing the actual arrangement of the range scale.

In carrying out my invention I establish a base line on the distance of separation of two substantially parallel mirrors upon which separate rays from the object are received. One of the mirrors is semi-transparent for direct viewing of the object and for reflecting the rays from the other mirror so that the separate rays appear to come from a substantially common viewpoint. As the angle of incidence of the separate rays from the object is different, the images will not normally register and an adjustable element is utilized to correct the angle of one of the mirrors to bring into exact registry the two images. The adjustable element cooperates with a scale to indicate the amount of such adjustment necessary to bring the image into registry and the scale is preferably made to read in terms of the distance of the object from the device. A further aid in obtaining this registration is contributed by the use of a colored glass for the semi-transparent mirror which causes the images to differ in color, thereby facilitating the identification of the separate images.

In the embodiment of the invention shown in Fig. 1, a rectangular tube 10 of any suitable dimension forms a container for the operating parts of my device. One end of the tube 10 is rendered light tight by an end piece 11 which may be secured in the end of the tube 10 in any suitable manner. The end piece 11 carries a projecting lug 12 to which is pivotally secured an L-shaped support member 13 by the pin 14. Near the pivoted end of the support member 13 a mirror 15 is mounted at an angle of approximately 45° with the axis of the tube 10 and behind a light opening 16 formed in the wall of the tube 10.

A spring 17 secured to the support member 13 by a screw 18 and having its free end bearing against the wall of the tube 10 is used to rotate the member 13 in a counter-clockwise direction, as viewed in Fig. 1. Near the other end of the tube 10 and surrounding the direct vision opening is a hollow cylindrical cam member suitably journaled in the wall of the tube 10 for rotation therein and which is provided with a cam surface 19 adapted to bear against a protuberance 20 formed on the free arm of the mirror supporting member 13. Upon rotation of the cam member by means of its knurled portion 21 the protuberance 20, which is at all times held in engagement with the cam surface 19 by the spring 17, is moved to rotate the support 13 and its pivot which adjusts the angle of the mirror 15 relative to the base line of the device. A semi-transparent mirror 22 is positioned behind the direct vision opening of the hollow cylindrical cam member and arranged in substantially parallel relation with the mirror 15. A U-shaped frame 23 secured to the wall of the tube 10 by rivets 24 supports in any suitable manner the semi-transparent mirror 22 in a fixed position in line with the opening in the cam member and a plane glass eye piece 25 which is held in position by a sheet metal ring 26 secured to the tube 10 by screws 27. The knurled portion 21 of the cam member carries a piece of plain glass 28 provided with a scale calibrated to give a direct reading in any desired unit, as in feet. A pointer 30 adapted to cooperate with the scale 29 is rigidly secured to the wall of the tube 10 and made U-shaped to permit free movement of the cam 19.

The optical system of my device will be readily understood by reference to Fig. 2. Direct rays from the object successively pass through the scale glass 28, the semi-transparent mirror 22, the plain eye piece 25 to the eye 31 of the observer. The margin 32 of the eye piece 25 is made spherical to focus the image of the scale 29 so that it may be read by the observer without removing his eye 31 from the eye piece 25. The indirect rays passing through the opening 16 fall on the mirror 15 and are reflected to the semi-transparent mirror 22 which reflects them to the eye 31 of the observer.

When the two mirrors 15 and 22 are in parallel relation the rays coming from an object at a finite distance will fall on the mirrors at different angles and the two images as viewed by the observer will appear out of register as shown in Fig. 5. These images may be brought into register, as shown in Fig. 6 by adjusting the angle of the mirror 15 and the amount of adjustment necessary bears a definite relation to the distance of the object from the mirror. This definite ratio is incorporated in the scale 29 so that it may be read directly in units of distance as is well known. The glass 28 rotates with the cam member and carries the scale 29 over the stationary pointer 30. The observer looking through the spherical margin 32 of the eye piece 25 sees a virtual image of the scale 29 and the pointer 30 which is easily read as soon as the images have been registered.

In order to enable the images to be seen more distinctly, I prefer to make the semi-transparent mirror 22 slightly colored, although such coloring forms no part of my invention.

When using the range finder of my invention, the observer places his eye near the eye piece 25 and directs the finder to bring into view the object he wishes to photograph or to learn its distance from him. He now turns the cam member by its knurled portion 21 until the two images coincide and then reads the distance directly from the scale 29 by looking through the spherical margin 32 of the eye piece 25.

Various changes may be made in the device specifically described above without departing from the scope of my invention as set forth in the appended claims.

What I claim as new and desire to secure by Letters Patent of the United States is:

1. In a range finder the combination with a casing, of a plane glass eye piece in one wall of said casing and directly in line with a first opening in the opposite wall of said casing, a semi-transparent mirror in the line of sight between said eye piece and said opening, a second opening in said wall axially spaced a predetermined distance from the first opening, a reflector positioned behind said second opening and adapted to cast a reflection of an object through the casing and on to the semi-transparent reflector whereby two images of the object are viewable through the eye piece, means for adjusting the angle of the reflector to superpose the two images, means for indicating the position of said adjusting means and a spherical margin on said glass eye piece for forming a virtual image of said indicating means.

2. In a range finder the combination with two relatively adjustable mirrors, of an eye piece for viewing an image of an object as formed by said mirrors, one of said mirrors being semi-transparent whereby the object may be viewed directly, means for adjusting one of said mirrors relatively to the other, a scale in the apparent field of view of the eye piece, and an indicator movable over said scale in accordance with the adjustment of said one of said mirrors, said eye piece having a plane parallel center portion for viewing the images of the object and an outer spherical portion for viewing the indicating scale.

Signed at Rochester, N. Y. this 1st day of December 1931.

JOSEPH MIHALYI.